US008720673B2

(12) United States Patent
Loecht

(10) Patent No.: US 8,720,673 B2
(45) Date of Patent: May 13, 2014

(54) TRANSPORT APPARATUS

(75) Inventor: Heinrich Loecht, Muggensturm (DE)

(73) Assignee: Robert Bosch GmbH, Stuttgart (DE)

( * ) Notice: Subject to any disclaimer, the term of this patent is extended or adjusted under 35 U.S.C. 154(b) by 120 days.

(21) Appl. No.: 13/146,959

(22) PCT Filed: Dec. 10, 2009

(86) PCT No.: PCT/EP2009/066794
§ 371 (c)(1),
(2), (4) Date: Oct. 7, 2011

(87) PCT Pub. No.: WO2010/086060
PCT Pub. Date: Aug. 5, 2010

(65) Prior Publication Data
US 2012/0018282 A1     Jan. 26, 2012

(30) Foreign Application Priority Data

Jan. 29, 2009 (DE) .......... 10 2009 000 480
Sep. 9, 2009 (DE) .......... 10 2009 029 314

(51) Int. Cl.
*B65G 19/22* (2006.01)
(52) U.S. Cl.
USPC .......... 198/725; 310/12.12; 198/619
(58) Field of Classification Search
USPC .......... 700/112, 95, 96, 114; 198/619, 465.2, 198/795, 690.1, 803.01, 805, 725; 318/135; 414/217, 939, 584, 222.12, 749.2; 310/12.19, 12.15
See application file for complete search history.

(56) References Cited

U.S. PATENT DOCUMENTS 4,446,962 A * 5/1984 Burkhardt ............... 198/457.07
4,628,238 A * 12/1986 Smulders et al. ............. 318/653
(Continued)

FOREIGN PATENT DOCUMENTS

DE      19538350       4/1997
EP      0346815 A2    12/1989
WO      03/105324 A1  12/2003

OTHER PUBLICATIONS

PCT/EP2009/066794 International Search Report.

*Primary Examiner* — Ramya Burgess
*Assistant Examiner* — Thomas Randazzo
(74) *Attorney, Agent, or Firm* — Michael Best & Friedrich LLP

(57) ABSTRACT

The invention relates to a transport apparatus for conveying a product, comprising a moveable conveying element (2) for conveying a product, a stationary sliding rail (3) that is arranged around the circumference for guiding the conveying element (2), and a drive device (5) for a linear motor for driving the conveying element (2), wherein the conveying element (2) comprises a main body (2a), a pusher finger (15) that can be brought into contact with the product, and a permanent magnet (6) that is operatively connected to the drive device (5) for the linear motor, wherein the conveying element (2) comprises a first running device (10), which is arranged on a side of the conveying element (2) in the running direction (A) of the conveying element (2), and a second running device (11) which is arranged on the other side of the conveying element (2) in the running direction (A) of the conveying element (2), and wherein the conveying element (2) comprises a guiding device (12, 22) that is arranged such that a resulting pre-stressing force (F) guides the conveying element (2) on the sliding rail (3) between the permanent magnet (6) and the drive device (5) for the linear motor.

20 Claims, 6 Drawing Sheets

(56) References Cited

U.S. PATENT DOCUMENTS

| | | |
|---|---|---|
| 4,825,111 A | 4/1989 | Hommes et al. |
| 5,127,337 A * | 7/1992 | Beattie et al. ............... 104/294 |
| 5,225,725 A | 7/1993 | Shiraki et al. |
| 5,809,892 A * | 9/1998 | Kruger et al. ............... 101/483 |
| 6,876,896 B1 | 4/2005 | Ortiz et al. |
| 7,770,714 B2 * | 8/2010 | Nozawa et al. ............... 198/619 |
| 7,988,398 B2 * | 8/2011 | Hofmeister et al. .......... 414/217 |
| 2007/0059131 A1 * | 3/2007 | Yoshitaka .................... 414/217 |
| 2008/0024015 A1 | 1/2008 | Tanioka et al. |
| 2009/0230785 A1 | 9/2009 | Ida et al. |

* cited by examiner

TRANSPORT APPARATUS

BACKGROUND OF THE INVENTION

The present invention relates to a transport apparatus for conveying a product for loading packaging machines, in particular horizontal tubular bag machines or cartoners, with piece goods.

Transport systems with independently driven conveying elements for supplying products to packaging machines are known in various designs from the prior art, for example from documents U.S. Pat. No. 6,876,896 B1 and U.S. Pat. No. 5,225,725. These systems comprise a stationary peripheral structure in which the conveying elements, after the conveying process, are guided back to the product inlet. For the turn-back needed to return the conveying elements to the product feed point, the smallest possible curve radii are used in order to achieve a compact structure that takes up as little space as possible. The used V-shaped guiding rollers of the conveying elements cannot be adjusted free of play, in particular for the transition from the linear conveying area to the curved area with small curve radii. Moreover, the V-shape of the guiding rollers generates high frictional forces with respect to the slide rail, and both parts are exposed to a high degree of wear despite continuous lubrication.

SUMMARY OF THE INVENTION

The transport apparatus according to the invention for conveying products has, by contrast, the advantage that guiding free of play is possible using a linear motor drive system and by virtue of a magnetic pre-stressing force acting on a permanent magnet in a conveying element. According to the invention, the transport apparatus for conveying a product comprises a moveable conveying element for conveying a product, a stationary slide rail that is arranged around the circumference for guiding the conveying element, and the linear motor drive device for driving the conveying element. The conveying element comprises a main body, a pusher finger that can be brought into contact with the product, and the permanent magnet that is operatively connected to the linear motor drive device. The conveying element comprises a first running device, which is arranged on one side of the conveying element in the running direction of the conveying element, and a second running device which is arranged on the other side of the conveying element in the running direction of the conveying element. The conveying element further comprises a guiding device that is arranged such that a resulting pre-stressing force between the permanent magnet and the linear motor drive device guides the conveying element on the slide rail. A very compact structure with minimal radii in the turn-back area of the slide rail can thus be achieved. The slide rail of the transport apparatus is preferably designed substantially in one piece with a channel, cut out from the solid material, for the conveying elements.

Particularly preferably, the first and/or second running device of the conveying element is a running roller. Also, the guiding device of the conveying element is preferably a guiding roller. Besides the fact that rollers can be produced inexpensively, the use of rollers also has the advantage of reliable and simple movement of the conveying element.

Preferably, the first and second running rollers and the guiding roller of the conveying element of the transport apparatus are profile-free rollers, which are only in contact with the slide rail without a form fit. In this way, the wear between the running rollers, the guiding roller and the slide rail can be considerably reduced, particularly in curved areas with small radii.

According to another preferred embodiment of the invention, the axes of the first and second running rollers are arranged offset in relation to each other on the conveying element, in order to be able to use running rollers with the greatest possible diameter, for a smooth movement of the conveying element that causes minimal wear.

Also preferably, the conveying element of the transport apparatus has a glide element, which is in contact with the slide rail for supporting the conveying element under a torque load about the Z-axis.

According to another preferred embodiment of the invention, the slide rail has a profile projection, which is arranged between the guiding roller and the glide element. In addition to the guiding with minimal friction, this also provides a support perpendicular to the running direction, on account of the resulting pre-stressing force between the permanent magnet and the linear motor drive device.

Moreover, in an alternative preferred embodiment, the transport apparatus according to the invention has two guiding rollers, as a result of which a support on the profile projection of the slide rail is possible without the arrangement of a stationary glide element on the conveying element.

In another preferred embodiment, the first running roller and a third running roller of the conveying element of the transport apparatus according to the invention are arranged on one side of the conveying element. By this means, the conveying element is guided more precisely, and free of play, in the running direction.

Preferably, in the conveying element of the transport apparatus according to the invention, the first running roller is arranged in a first plane and the second running roller is arranged in a second plane, and the first plane and the second plane are arranged parallel to each other. In this way, the first and second running rollers can be supported, particularly in curved areas, on two different surface areas of the slide rail.

According to another preferred embodiment of the invention, the third running roller of the conveying element is arranged in a third plane, which is arranged parallel to the first and second planes. In this way, the conveying element can be radially supported on another surface area of the slide rail.

In another preferred embodiment, at a turn-back area of the slide rail, separate cam tracks with corresponding trajectories are present for each of the running rollers, wherein the trajectories of the cam tracks differ from one another in order to permit lowering of the pusher finger perpendicular to the conveying direction before the conveying element turns back. By virtue of the fact that the pusher finger is firstly lowered, the product to be conveyed is not interfered with or displaced by means of the pusher finger being deflected and pivoting too early. In addition, the separate cam tracks permit separate support of each running roller on the slide rail, and this contributes greatly to the conveying element being able to turn back in an operationally reliable manner, with minimal friction and free of play, even with very small curve radii.

According to another alternative embodiment of the present invention, the running device and/or the guiding device of the conveying element are designed not as running rollers, but instead as electromagnetic or pneumatic running elements. In this way, it is possible to ensure contact-free movement of the conveying element. This has the great advantage of avoiding wear on the conveying element and also on the slide rail, such that a long useful life is achievable. When using an electromagnetic running or guiding element, the operating principle is based on a control of repulsive forces between autonomous coils, which are powered by power converters, and the conveying elements equipped with permanent magnets.

Also preferably, the electromagnetic guiding device comprises a multiplicity of coils on the slide rail and at least one permanent magnet on the conveying element. A control system is also preferably provided, in order to keep constant a distance between the coils and the permanent magnets. In this way, a magnetically pre-stressed guiding for the conveying element can be achieved.

BRIEF DESCRIPTION OF THE DRAWINGS

Illustrative embodiments of the invention are described in detail below with reference to the attached drawing, in which.

DETAILED DESCRIPTION

A transport apparatus 1 according to a first preferred illustrative embodiment of the invention is described in detail below with reference to FIGS. 1 to 4.

Figure 1:
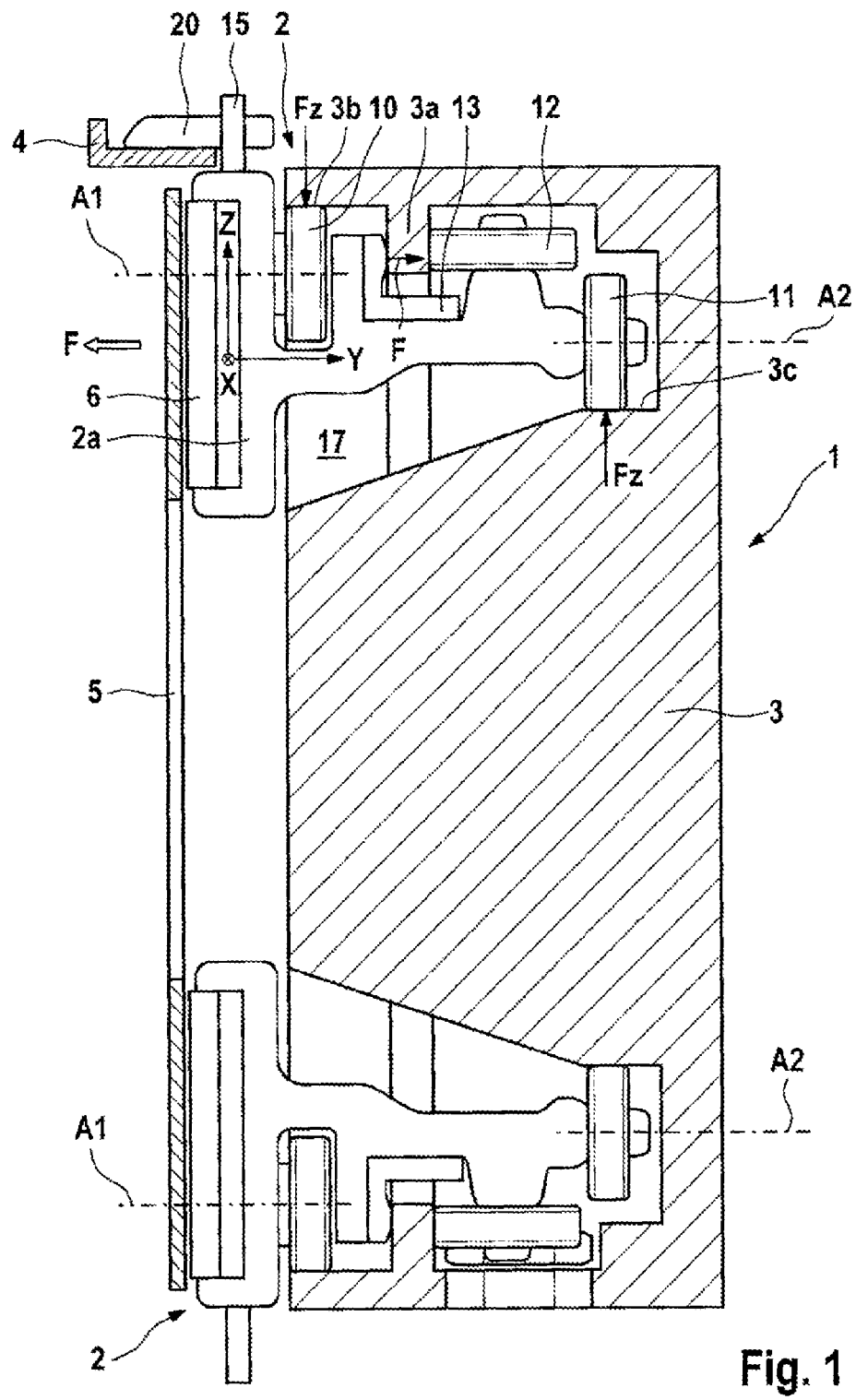
FIG. 1 shows a schematic horizontal sectional view of the transport apparatus according to the invention in a first illustrative embodiment.

The schematic sectional view in FIG. 1 shows the transport apparatus 1 in horizontal cross section, wherein the upper conveying element 2 shown in FIG. 1 transports a product 20, which is arranged on a conveyor belt 4, by means of a pusher finger 15. The conveying element 2 shown at the bottom of FIG. 1 (and depicted, for reasons of clarity, without corresponding reference signs for the individual structural parts) is guided back to the product feed point via a slide rail 3. As can also be seen from the schematic sectional view in FIG. 1, the conveying element 2 comprises a main body 2a on which permanent magnets 6 are arranged which, through a resulting magnetic force F, are operatively connected to a linear motor drive device 5, which drives the conveying element 2. The conveying element 2 also has a first running roller 10, which is arranged on the left-hand side of the conveying element 2 in the conveying direction A, and a second running roller 11, which is arranged on the right-hand side of the conveying element 2 in the conveying direction. This first running roller 10 and second running roller 11 support the conveying element 2 on the slide rail 3 in vertically opposed directions, in each case with a force Fz. A third running roller 14 (cf. FIG. 2) is arranged parallel to the first running roller 10. Moreover, a horizontal guiding roller 12 is arranged as a guiding device on the main body 2a and supports the conveying element 2 on a profile projection 3a of the slide rail 3 by means of the resulting magnetic force F with a counter force F. Axes A1, A2 of the running rollers 10 and 11 are arranged vertically offset in relation to each other in such a way that both force pairs (F, F; Fz, Fz) always form a torque equilibrium. Thus, a pre-stressing is achieved via the lever action by the vertically offset axes A1, A2 of the running rollers 10, 11, such that there is a torque equilibrium. In this connection, the axis A2 of the second running roller 11 is arranged further inward on the slide rail 3 than the axis A1 of the first running roller 10. A tilting moment resulting from the magnetic force F is supported by the force pair on the running rollers 10, 14, and 11. In addition, the conveying element 2 has a glide element 13, which is in contact with the profile projection 3a of the slide rail 3, on the side opposite the guiding roller 12, in order to guide the conveying element 2.

Figure 2:
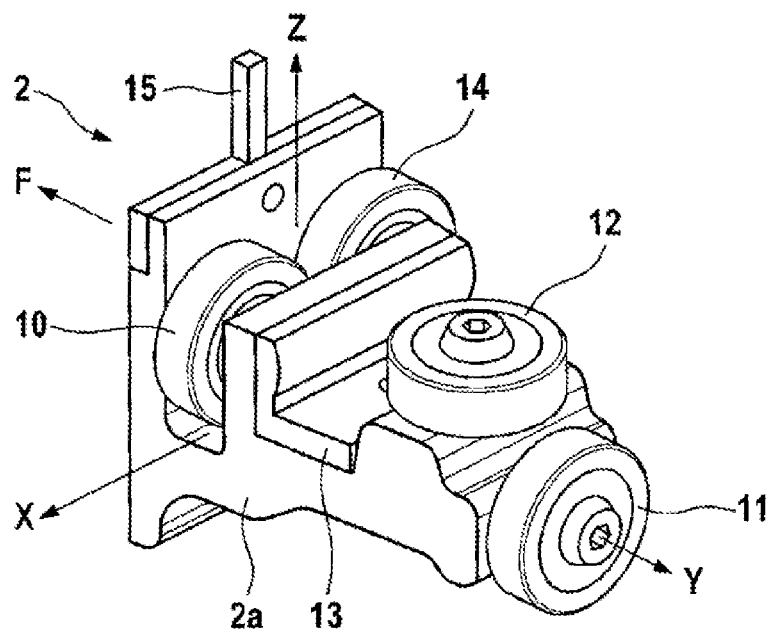
FIG. 2 shows a perspective view of the conveying element from FIG. 1.

FIG. 2 shows a perspective view of the conveying element 2 from FIG. 1, in which a third running roller 14 is arranged, and also the axis directions X, Y and Z of a three-dimensional coordinate system. As can be seen from FIG. 2 in conjunction with FIG. 1, the running rollers 10 and 14 support the conveying element 2 in the positive Z-axis direction, and the running roller 11 supports the conveying element 2 in the negative Z-axis direction, while the guiding roller 12 and the glide element 13 ensure guiding in the X-axis direction. In this way, the conveying element 2 is moveable only in the X-axis direction, which forms the running direction of the conveying element 2.

Figure 3:
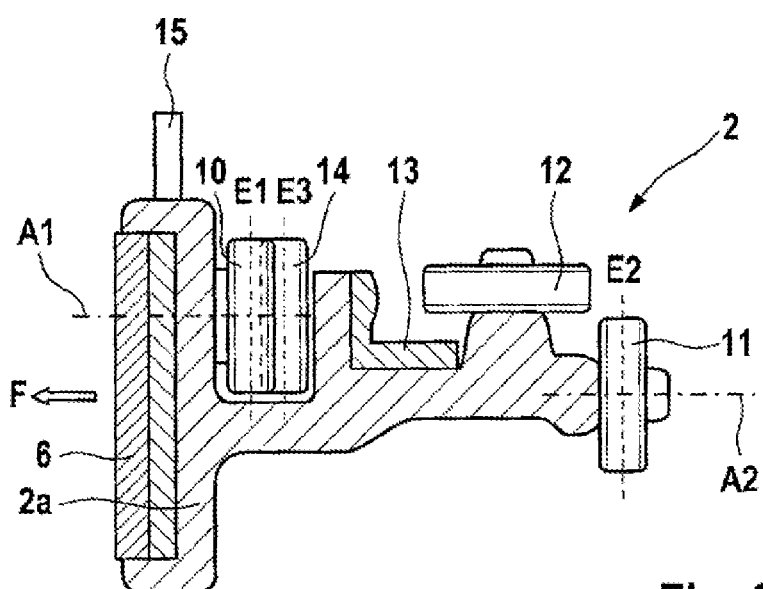
FIG. 3 shows a horizontal sectional view of the conveying element from FIG. 2.

FIG. 3 shows a horizontal sectional view of the conveying element 2 from FIG. 2 and in particular depicts more clearly the position relationships of the first running roller 10, second running roller 11 and third running roller 14. As can be seen from FIG. 3, the first running roller 10 is arranged on a first vertical plane E1, the second running roller 11 is arranged on a second vertical plane E2, and the third running roller 14 is arranged on a third vertical plane E3, which planes are all arranged parallel to one another. As can also be seen from FIG. 3, the axes A1, A2 of the running rollers 10 and 11 are arranged vertically offset in relation to each other.

Figure 4:
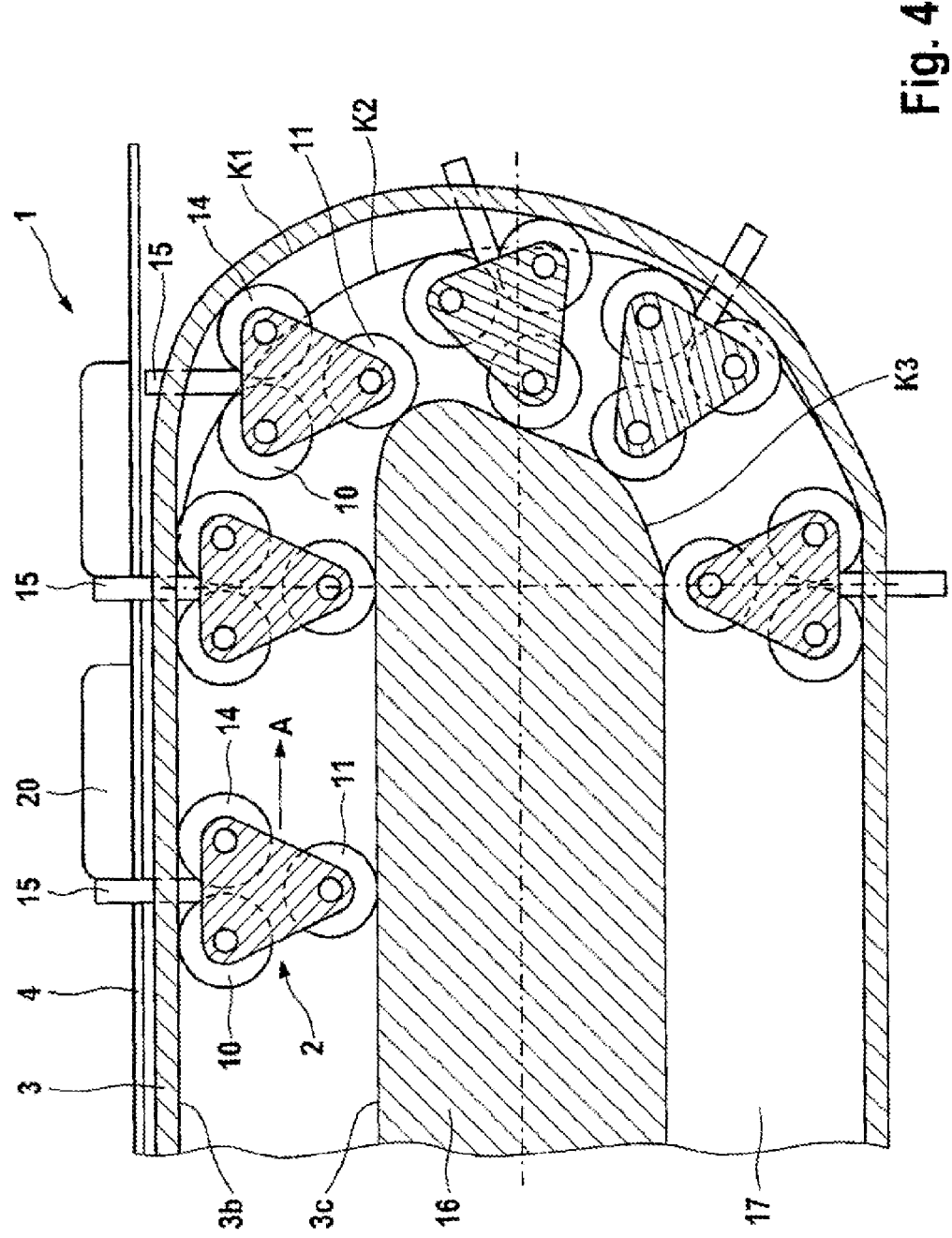
FIG. 4 shows a schematic sectional view of the turn-back area of the transport apparatus according to the invention for illustrating the sequence of movement of the conveying element rolling on the different trajectories.

FIG. 4 shows a schematic horizontal sectional view of the turn-back area of the transport apparatus 1 according to the invention. In FIG. 4, several conveying elements 2 are shown offset in the running direction A, in order to better illustrate the sequence of movement of these conveying elements 2 at the turn-back. The conveying element 2, driven by the linear motor drive device 5 (not shown here), conveys the product 20 on the conveyor belt 4, by means of the pusher finger 15 pushing the product 20 forward on the conveyor belt 4. In this linear movement of the conveying element 2, the first running roller 10 and the third running roller 14 roll along the inner slide surface 3b of the slide rail 3, while the second running roller 11 rolls along the slide surface 3c of a core region 16 of the slide rail 3. To allow the conveying element 2 to turn back through 180° in the turn-back area, separate cam tracks K1, K2 and K3 are configured on the slide rail 3 in such a way that the conveying element 2 running in the running direction is first of all lowered perpendicular to the running direction, such that the pusher finger 15 disengages from the product 20 by a non-rotating movement, before the turning-back movement of the conveying element 2 begins. In this sequence of movement, the third running roller 14 rolls along the cam track K1, which forms the inner slide surface 3b of the slide rail 3, the first running roller 10 rolls along the cam track K2, which is designed as an offset on the slide rail 3, and the second running roller 11 continues to roll along the cam track K3, which forms the slide surface 3c of the core region 16 of the slide rail 3. Here, in particular, the trajectory of the third cam track K3 represents, with its different successive radii, the lowering movement and the subsequent pivoting movement, which is generated in addition by the rolling movement of the running rollers 10 and 14 on the cam tracks K2 and K1. At the product feed point, at the opposite end (not shown in FIG. 4) of the transport apparatus 1, a channel 17 of the slide rail 3 for movement of the conveying elements 2 can be designed normally, i.e. with constant radii, and thus at less cost, since a separate pivoting and lifting movement of the conveying elements 2 is not strictly necessary.

Figure 5:
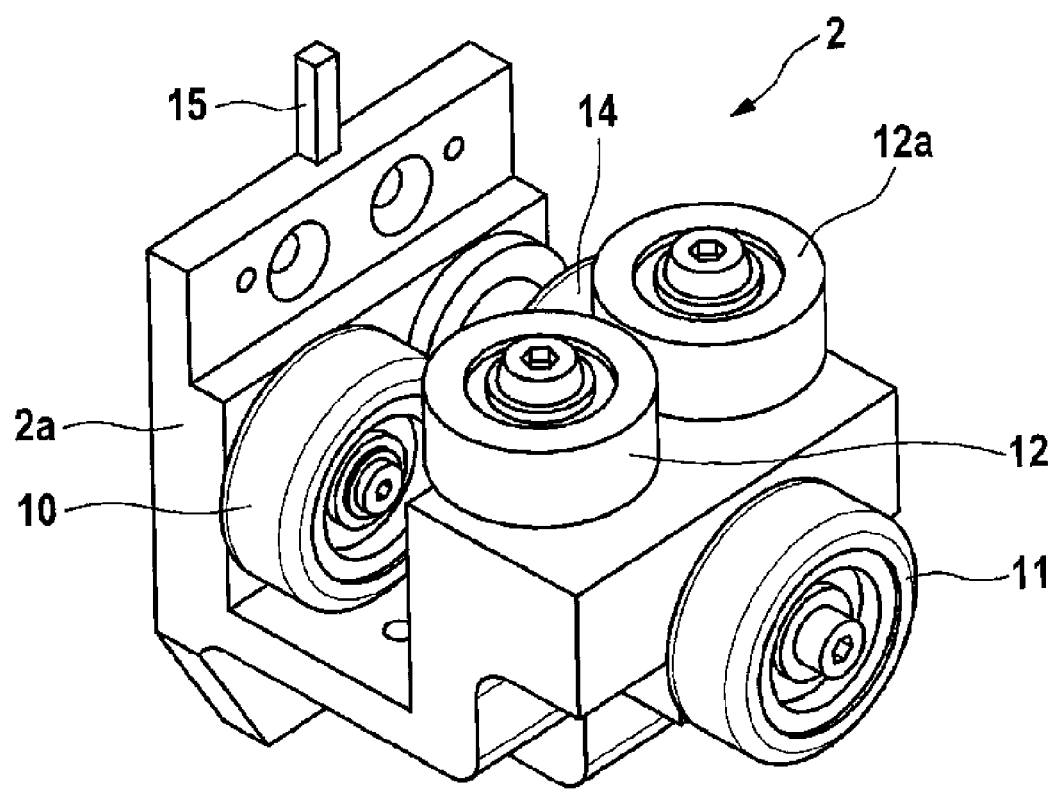
FIG. 5 shows a perspective view of a second illustrative embodiment of the conveying element of the transport apparatus according to the invention.

FIG. 5 shows a perspective view of a second illustrative embodiment with an alternative conveying element 2 of the transport apparatus 1 according to the invention. In FIG. 5, identical structural parts in the second illustrative embodiment are identified by the same reference signs as in the first illustrative embodiment. Instead of the guiding roller 12 and of the glide element 13 in the first illustrative embodiment shown in FIG. 2, the guiding device in this illustrative embodiment is in the form of two guiding rollers 12 and 12a arranged one behind the other on the main body 2a. These two guiding rollers 12 and 12a support the conveying element 2, by virtue of the resulting magnetic force F, on the profile projection 3a (not shown here) of the slide rail 3. FIG. 5 also shows the strongly offset arrangement of the running rollers 10 and 14 which, in the turn-back of the conveying element 2 as described in FIG. 4, roll along and are supported on the separate cam tracks K1 and K2.

A transport apparatus according to a third illustrative embodiment of the invention is described below with reference to FIGS. 6 and 7, where identical parts, or parts having an identical function, are identified by the same reference signs as in the preceding illustrative embodiment.

Figure 6:
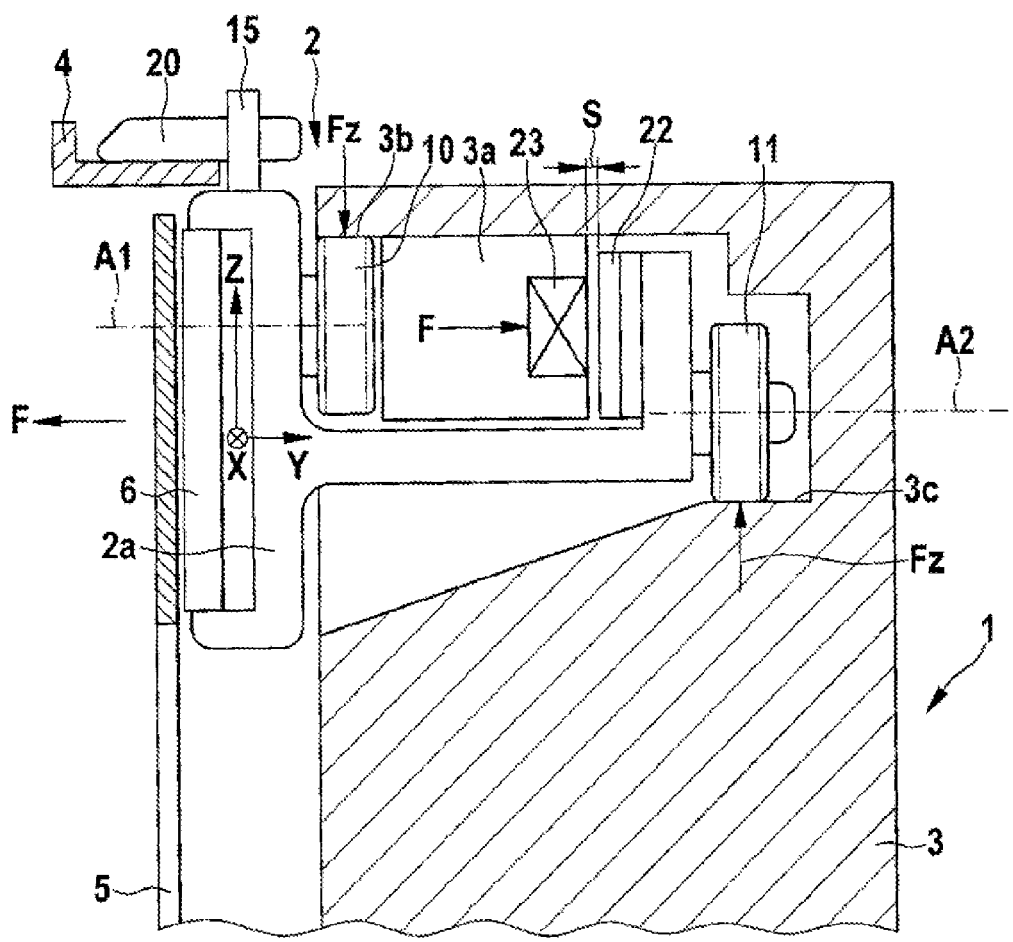
FIG. 6 shows a schematic sectional view of a transport apparatus according to a third illustrative embodiment of the invention.

As can be seen from FIG. 6, the conveying element 2 of the third illustrative embodiment has, instead of guiding rollers, an electromagnetic guiding element 22. The electromagnetic guiding element comprises permanent magnets 22, which are arranged on the conveying element 2, and coils 23, which are arranged on the slide rail 3, more specifically on the profile projection 3a of the slide rail. A distance S between the coils 23 and the permanent magnets 22 is maintained constant by means of a control system 24.

Figure 7:
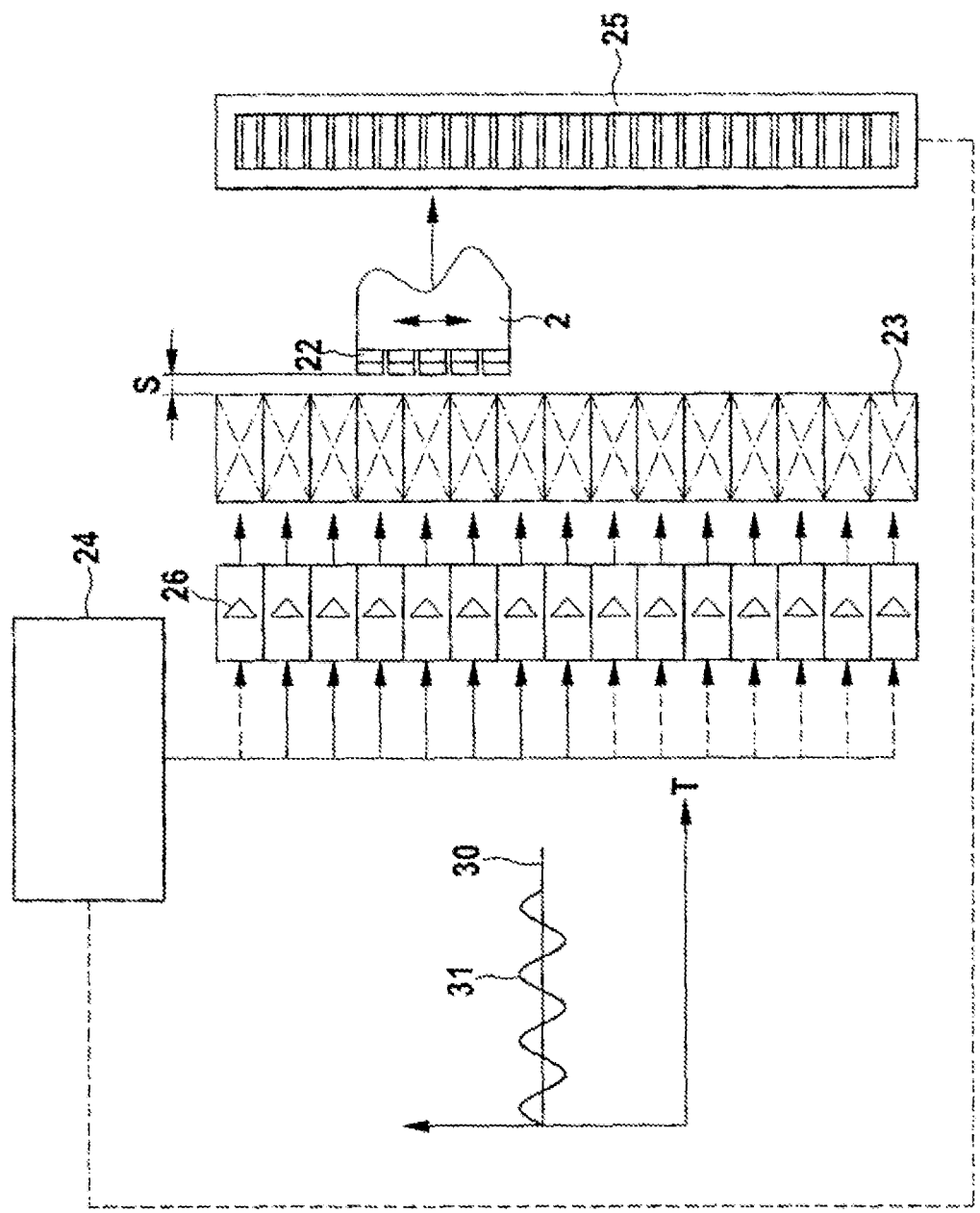
FIG. 7 shows a schematic representation of the function of an electromagnetic guiding device according to the third illustrative embodiment.

FIG. 7 is the schematic representation of the mode of operation of the transport apparatus according to the third illustrative embodiment. A displacement sensor 25 arranged on the slide rail 3 is connected to the control system 24 and can determine a position of the conveying element 2. The control system 24 is also connected by lines to a multiplicity of power converters 26, which power the coils 23. In FIG. 7, the inactive power converters are designated by the dashed arrows between the control system 24 and the power converters 26. The control system 24 regulates the repulsive forces between the autonomous coils 23, each powered via individual power converters 26, and the conveying elements 2 equipped with the permanent magnets 22. On the basis of a position feedback via the displacement sensor 25, which transmits the position of the conveying element 2 to the control system 24, the control system 24 generates constant control voltages on the coils, covered by the permanent magnets 22, and on the associated power converters 26. The magnitudes of the voltage and of the magnetic force can be individually modified via a superposed distance control. For this purpose, a distance S between the permanent magnets 22 and the coils 23 is determined constantly, with a distance measurement preferably being carried out continuously. For the distance measurement, a carrier frequency of an oscillator (oscillating circuit) is superposed on the control voltage 30. In FIG. 7, the oscillator voltage is designated by reference sign 31, and the control voltage 30 and the oscillator voltage 31 are plotted over time T. The frequency change that occurs in the oscillator signal when the distance changes is used as actual value for the distance S. The actual value for the distance S is then used for the distance control by the control system 24.

The transport apparatus of the third illustrative embodiment thus comprises an electromagnetically pre-stressed conveying element 2. This has very great advantages, especially in the curved area of the slide rail, since contact-free guiding of the conveying element is possible. In this way, wear on the conveying element and also on the slide rail 3 can be avoided. By controlling the distance S between the permanent magnets 22 and the coils 23, it is also possible to obtain a desired pre-stressing of the conveying element 2. In other respects, this illustrative embodiment corresponds to the preceding illustrative embodiments, and reference can therefore be made to the description given for these.

Therefore, compared to the prior art, the transport apparatus 1 according to the invention and described in the illustrative embodiments has the advantage that the conveying elements 2 can be guided free of play even in curved areas or at the transition from a linear area to a curved area. By virtue of the resulting constant supporting load or bearing load, the useful life of the moved structural parts of the conveying element 2 and of the slide rail 3 can be significantly extended.

In particular as a result of the convex surfaces of the running rollers, it is not necessary to lubricate the running rollers, which results in soiling of the slide rail 3. The different cam tracks on the slide rail 3 permit a cam-controlled, individually adapted correction movement of the running rollers 10, 11, 14 of the conveying element 2 in the turn-back area. With regard to tolerances in the manufacture of the structural parts, the guiding system used for the conveying element 2 of the transport apparatus 1 according to the invention, and having profile-free running and guiding rollers, is also extremely tolerant of faults and is unsusceptible to interferences.

The invention claimed is:

1. A transport apparatus for conveying a product (20), comprising:
a moveable conveying element (2) for conveying the product,
a stationary, continuously arranged slide rail (3) for guiding the conveying element (2), and
a linear motor drive device (5) for driving the conveying element (2),
wherein the conveying element (2) comprises a main body (2a), a pusher finger (15) that can be brought into contact with the product, and a permanent magnet (6) that is operatively connected to the linear motor drive device (5),
wherein the conveying element (2) comprises a first running device (10), which is arranged on one side of the conveying element (2) in a running direction (A) of the conveying element (2), and a second running device (11), which is arranged on an other side of the conveying element (2) in the running direction (A) of the conveying element (2),
wherein the first and second running devices (10, 11) support the conveying element (2) on the slide rail (3) with a force ($F_z$) in opposing directions along a first direction (Z),
wherein the conveying element (2) comprises a guiding device (12, 22) that is arranged such that a resulting pre-stressing force (F) between the permanent magnet (6) and the linear motor drive device (5) guides the conveying element (2) on the slide rail (3), supported by a counterforce (F), the pre-stressing force (F) acting along a second direction (Y), wherein the running direction (A), the first direction (Z), and the second direction (Y) are each perpendicular to one another, wherein at least one of the first and second running devices (10, 11) is a profile-free track roller which contacts the slide rail (3) only in a non-form fit manner, or at least one of the first and second running devices (10, 11) is an electromagnetic or pneumatic running device, wherein the counterforce (F) and the pre-stressing force (F) generate a force couple (F, F), and the running devices (10, 11) generate a force couple ($F_z$, $F_z$), and wherein the first and second running devices (10, 11) and the guiding device (12, 22) are arranged on the conveying element (2) such that the force couple (F, F) and the force couple ($F_z$, $F_z$) form an equilibrium of moments.

2. The transport apparatus as claimed in claim 1, wherein at least one of the first and the second running device (10, 11) is a running roller.

3. The transport apparatus as claimed in claim 2, wherein at least one of the first and second running rollers (10, 11) and the guiding roller (12) are profile-free rollers, which are only in contact with the slide rail (3) without a form fit.

4. The transport apparatus as claimed in claim 2, wherein axes (A1, A2) of the first and second running rollers (10, 11) are arranged offset in relation to each other on the conveying element (2).

5. The transport apparatus as claimed in claim 1, wherein the conveying element (2) has a glide element (13), which is in contact with the slide rail (3) for guiding the conveying element (2).

6. The transport apparatus as claimed in claim 5, wherein the slide rail (3) has a profile projection (3a), which is arranged between the guiding device (12, 22) and the glide element (13).

7. The transport apparatus as claimed in claim 2, wherein two guiding rollers (12, 12a) are provided.

8. The transport apparatus as claimed in claim 2, wherein the first running roller (10) and a third running roller (14) are arranged on one side of the conveying element (2).

9. The transport apparatus as claimed in claim 8, wherein the first running roller (10) is arranged in a first plane (E1) and the second running roller (11) is arranged in a second plane (E2), and the planes (E1, E2) are arranged parallel to each other.

10. The transport apparatus as claimed in claim 9, wherein the third running roller (14) is arranged in a third plane (E3), which is arranged parallel to the planes (E1, E2).

11. The transport apparatus as claimed in claim 8, wherein, at a turn-back area (16) of the slide rail (3), separate cam tracks (K1, K2, K3) are present for each of the running rollers (10, 11), wherein trajectories of the cam tracks differ from one another in order to permit lowering of the pusher finger (15) perpendicular to a conveying direction before the conveying element (2) turns back.

12. The transport apparatus as claimed in claim 1, wherein at least one of the first and the second running device and the guiding device (22) is an electromagnetic or pneumatic running or guiding element.

13. The transport apparatus as claimed in claim 12, wherein the electromagnetic guiding device (22) comprises a multiplicity of coils (23) on the slide rail (3) and at least one permanent magnet (22) on the conveying element (2).

14. The transport apparatus as claimed in claim 13, further comprising a control system (24), which controls a pre-stressing on the conveying element (2) by controlling a distance (S) between the coils (23) and the at least one permanent magnet (22).

15. The transport apparatus as claimed in claim 1, further comprising a displacement sensor (25) for determining the position of the conveying elements (2).

16. The transport apparatus as claimed in claim 2, wherein the guiding device (12) is a guiding roller.

17. The transport apparatus as claimed in claim 1, wherein the guiding device (12) is a guiding roller.

18. The transport apparatus as claimed in claim 1, wherein the guiding device (12) is disposed between the running devices (10, 11).

19. The transport apparatus as claimed in claim 1, wherein the guiding device (12) is disposed above the running device (11).

20. The transport apparatus as claimed in claim 1, wherein the running devices (10, 11) contact opposite sides of the slide rail (3).

* * * * *

UNITED STATES PATENT AND TRADEMARK OFFICE
CERTIFICATE OF CORRECTION

PATENT NO.       : 8,720,673 B2                                  Page 1 of 1
APPLICATION NO. : 13/146959
DATED            : May 13, 2014
INVENTOR(S)      : Heinrich Loecht It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 189 days.

Signed and Sealed this

Twenty-ninth Day of September, 2015

Michelle K. Lee
*Director of the United States Patent and Trademark Office*